(12) United States Patent
Akyol et al.

(10) Patent No.: US 8,503,468 B2
(45) Date of Patent: Aug. 6, 2013

(54) PCI EXPRESS LOAD SHARING NETWORK INTERFACE CONTROLLER CLUSTER

(75) Inventors: Bora Akyol, San Jose, CA (US); Daniel Talayco, Mountain View, CA (US); Ali Ekici, Los Gatos, CA (US)

(73) Assignee: Fusion-io, Inc., Salt Lake City, UT (US)

( * ) Notice: Subject to any disclaimer, the term of this patent is extended or adjusted under 35 U.S.C. 154(b) by 139 days.

(21) Appl. No.: 12/265,698

(22) Filed: Nov. 5, 2008

(65) Prior Publication Data

US 2010/0115174 A1 May 6, 2010

(51) Int. Cl.
H04L 12/28 (2006.01)
(52) U.S. Cl.
USPC ............................ 370/419; 370/389; 709/232
(58) Field of Classification Search
USPC .................................. 370/419, 389; 709/232
See application file for complete search history.

(56) References Cited

U.S. PATENT DOCUMENTS

| 7,633,871 | B1 * | 12/2009 | Callon | 370/235 |
|---|---|---|---|---|
| 2004/0213220 | A1 * | 10/2004 | Davis | 370/389 |
| 2005/0078672 | A1 * | 4/2005 | Caliskan et al. | 370/389 |
| 2006/0242313 | A1 * | 10/2006 | Le et al. | 709/230 |
| 2007/0027991 | A1 * | 2/2007 | Sikdar et al. | 709/227 |
| 2009/0063696 | A1 * | 3/2009 | Wang et al. | 709/232 |

* cited by examiner

Primary Examiner — Wei Zhao (57) ABSTRACT

Embodiments provide load balancing in a virtual computing environment comprising a plurality of PCI-Express switches (the PCIe switching cloud) coupled to a plurality of network interface devices (NICs). An NIC cluster is added between the PCIe switching cloud and the NICs. The NIC cluster is configured to hide NICs from system images and allow the system images to access functions across multiple NICs. The NIC cluster of an embodiment dynamically load balances network resources by performing a hashing function on a header field of received packets. The NIC cluster of an embodiment performs load balancing and state management in association with driver software, which is embedded in the system image. The driver software adds a tag for flow identification to downstream data packets. The NIC cluster distributes data packets based on information in the tag.

48 Claims, 5 Drawing Sheets

PCI EXPRESS LOAD SHARING NETWORK INTERFACE CONTROLLER CLUSTER

BACKGROUND

The Peripheral Component Interconnect (PCI) standard has continued to meet the needs of CPUs and IO (Inputs/Outputs) devices by increasing the performance while maintaining backward compatibility. In 2002, the PCI-SIG (www.pcisig.com) introduced a new physical implementation of PCI, called PCI Express (abbreviated as PCIe hereinafter). PCIe has a signaling rate of 2.5 Gbaud or an effective data rate of 2.0 Gb/s (due to the 8b/10b encoding) per lane. PCIe is scalable (i.e., multiple lanes can be combined to provide x4, x8, x16 and higher bandwidth), and therefore, can deliver the performance required for next-generation 10 Gb Ethernet (10 GbE) and Fibre Channel IO adapters.

PCI Express was originally designed for desktops connecting a root complex (a host CPU with memory) with downstream IO devices, but has since found applications in servers, storage devices, and other communications systems. The base PCIe switching structure of a single root complex has a tree topology, which addresses PCIe endpoints through a bus numbering scheme.

There has been much progress over the last few years in the areas of the virtualization of computation resources and storage. Virtual machine (VM) technology has emerged to provide the ability to run multiple virtual servers on a single physical server while sharing the physical CPU and memory resources of the physical server. VM technology has basically been driving new CPU architectural development. CPU vendors are now providing CPUs with increasing number of cores, which are particularly well suited for running multiple virtual machines.

A virtual machine is defined as a software implementation of a machine (computer) that executes programs like a real machine. Virtualization refers to the abstraction of computer resources, and is a technique of hiding the physical characteristics of computing resources from the way in which other systems, applications, or end users interact with those resources. CPU power has been doubling every 18 months following Moore's Law. Server virtualization is a way to leverage the exponential growth of CPU power. When a physical server is virtualized, it results in multiple logical servers with each logical server comprising a virtual machine. A system image is a software component running on the virtual machine. It is called system image because it can be closed down and resumed operations later at exactly the same states when left previously. A system image is assigned to a specific virtual machine. Since each system image (SI) is associated with a virtual machine, system images and virtual machines are used interchangeably in the following description.

IO capacity has been lagging CPU performance. In order to match the IO capacity to the CPU performance growth, one way is to increase the server physical size (large, expensive rack) to accommodate more network interconnections such as Ethernet network interface cards (NICs), InfiniBand host channel adapters (HCAs), and Fibre Channels (FC) host bus adapters (HBAs). The situation has been recognized by chip vendors and PCI-SIG to develop virtual IO standards to allow multiple operating systems on a given machine to natively share PCIe devices. The concept is to assign multiple virtual machines to a multi-function device having high-speed IOs such as InfiniBand, Fibre Channel or 10 GbE (10 Gigabit Ethernet).

The progress in virtualization of IO connectivity has not been able to keep up with the technological advance of multi-core CPUs. A physical server contains a limited number of physical ports (e.g., Ethernet NICs for LAN access, Fibre Channel HCAs for SAN access). Because server IO connectivity is fixed, the server IO capability cannot be scaled in real-time according to demand. An increase in bandwidth requires physical intervention, for example, through a manual insertion of NICs or physical replacement of current NICs with ones having higher bandwidth. Even if a sufficient number of physical endpoints is available, this rigid topology leads to system inefficiencies because it is optimized only for one type of applications; and if the server is re-targeted for other applications, the IO connectivity needs to be re-configured. And physical removal of a NIC causes the existing system state to reset.

Upgrading the network infrastructure by replacing the current IO interface modules with state-of the art and more expensive ones generally does not provide system flexibility because the increased IO capacity, if implemented to meet peak traffic for a certain application, will remain most of the time underutilized. Sharing physical IO resources through IO virtualization (IOV) appears to be a good solution for adapting to the increasingly use of multi-core processors in servers. IO virtualization allows virtual machines to share expensive high-bandwidth IOs such as 10 Gb Ethernet or 8 Gb Fibre Channel, and hence justifies their deployment.

The PCI-SIG Working Group is developing a new specification that adds IO virtualization capability to PCI Express. The new specification in development defines two levels of IO virtualization: the single-root IO virtualization (SR-IOV) and the multi-root IO virtualization (MR-IOV). The SR-IOV provides a standard mechanism for endpoint devices to advertise their ability to be simultaneously shared among multiple virtual machines running on the same hardware platform (one host CPU). The MR-IOV allows sharing of an IO resource between multiple operation systems on multiple hardware platforms (multiple host CPUs).

Figure 1:
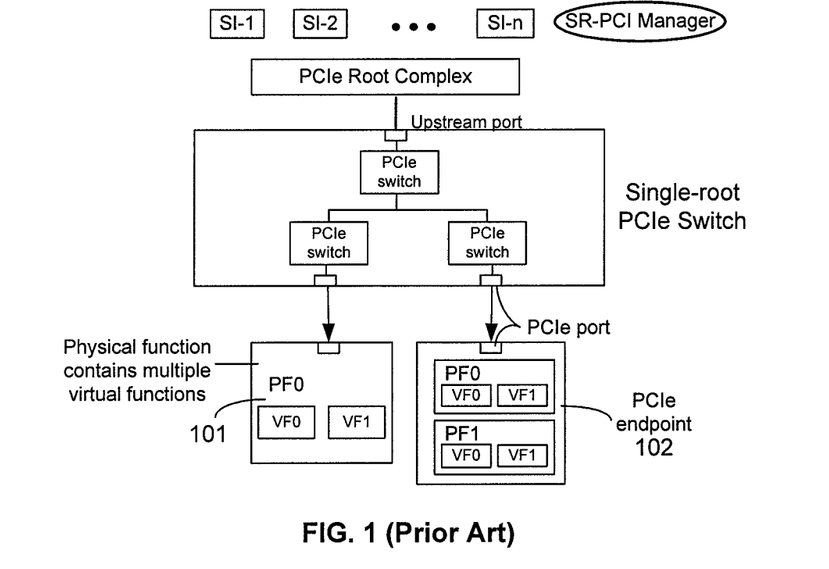
FIG. 1 shows a single-root topology containing n system images, SI-1, SI-2, . . . , SI-n. The root complex is associated with two IOV PCIe endpoints 101 and 102. Endpoint 101 contains a physical function PF0 having two virtual functions VF0 and VF1. Endpoint 102 contains two physical functions PF0 and PF1, each has two virtual functions VF0 and VF1.

The IO virtualization provides a means to datacenter managers and network administrators to use the existing resources more efficiently, e.g., they can allocate more physical endpoints to a virtual machine when it requires additional bandwidth. FIG. 1 shows an SR-IOV topology. A single-root PCI Manager (SR-PCIM) software is added to the server computer system to virtualize and manage system resources. The SR-PCIM software maps each system image to a specific virtual function inside an endpoint. The physical function is equivalent to a native PCIe function with the additional capability of IO virtualization, i.e., it can contain multiple virtual functions. The single-root PCIe switch may comprise multiple PCIe switches coupled in a tree topology, with each switch equivalent to a native PCIe switch. The SR-PCIM software is running on the host, i.e., it utilizes the host CPU resources. The physical function PF is a PCIe function (per the PCI Express Base Specification) that supports the SR-IOV capability. A virtual function associated with a physical function (e.g., VF0, VF1 in PF0 or in PF1) must be the same device type as the physical function.

Figure 2:
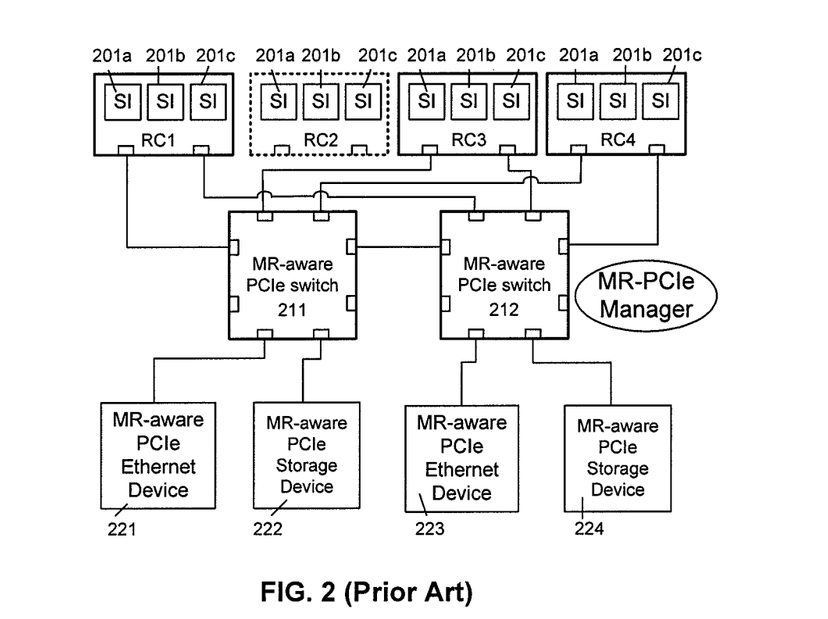
FIG. 2 shows a multi-root topology with four root complexes, each root complex comprises three system images. The system images are coupled to the Ethernet and storage IO devices through the MR-aware PCIe switches.

FIG. 2 shows an MR-IOV topology. In order to support the multi-root topology, PCIe switches and IOV devices need to be MR aware (i.e., they are capable of supporting a multi-root system). MR-aware IO adapters and PCIe switches must have additional register sets to support the various root-complex routings, and an MR-aware PCIe switch must contain two or more upstream ports. In contrast to the SR-IOV specification, which does not change the data link or transaction layers specified in the PCI Express Base Specification, the MR-IOV specification requires modifications in the data link layer. There is also a change in the configuration software to configure the switch fabric and the MR-aware endpoints. The MR-PCI Manager can be implemented above a root complex or sideband off the MR-aware switches. The MR-aware PCIe switches can be interconnected in a variety of topologies: star, tree and mesh.

In summary, current IO adapters and current PCIe devices do not have IO virtualization capabilities. They are designed to be controlled by a single device driver in a single OS (operation system) kernel. Hence, a PCIe device provides all its bandwidth to a single OS running on the physical CPU. Current VM software does not allow operating systems to access IO devices directly, so all IO operations are handled by a VM Manager (VMM) or hypervisor. Server virtualization results in increased IO utilization because virtual machines (system images) need to connect to different data and storage networks. The proposed IOV approaches are handled in software by the PCI Manager which is responsible for the IO resource assignment and may not be the most efficient solution. In the SR-IOV architecture, multiple system images are sharing a PCIe IOV endpoint. There are two problems with this approach: 1) One physical NIC may be shared by multiple VMs and therefore be overloaded. The system has no capability to share another NIC dynamically to distribute the load; and 2) NICs, when dynamically added, may not get utilized immediately and, a NIC, when physically removed, causes the existing system to reset. In the case of MR-IOV architecture, new types of PCIe switches and new types of PCIe endpoint devices need to be deployed. Furthermore, the PCIe endpoint can become the bottleneck in both proposed IOV topologies because the proposed IOV specifications do not support the spreading of virtual functions across multiple physical devices.

Figure 3:
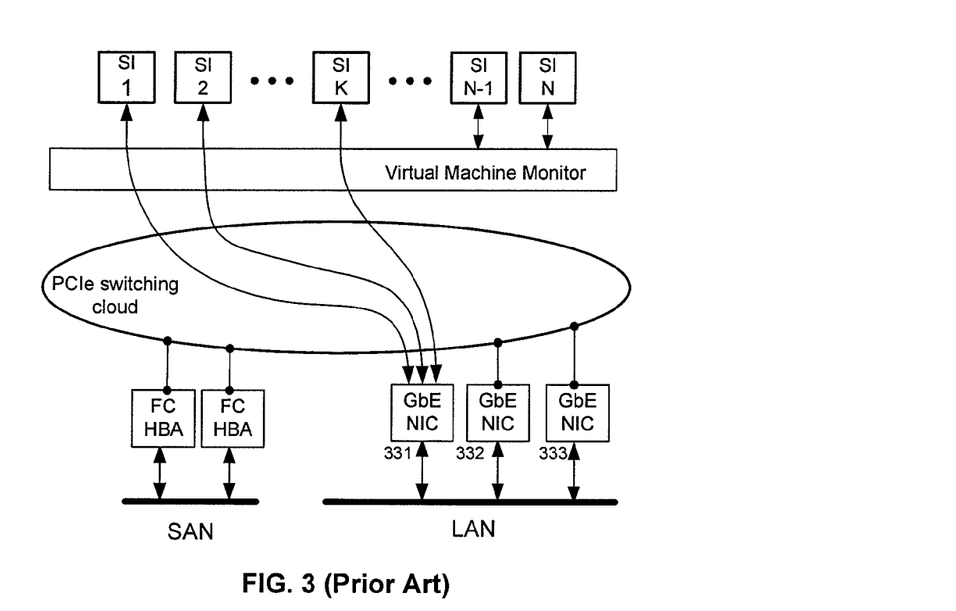
FIG. 3 shows multiple system images sharing a single IO (e.g., a GbE NIC) through a PCIe switching cloud in order to access a LAN.

FIG. 3 shows the topology of a cluster of system images connected to a PCIe switching cloud. The PCIe switching cloud (also referred to as PCIe switched fabric) comprises a plurality of PCIe switches, which can be conventional such as those shown in FIG. 1 or MR-aware such as those shown in FIG. 2. The PCIe switching cloud is coupled to a plurality of network interface cards. Multiple system images are sharing a GbE NIC to access a local area network (LAN) or a FC HBA to access a storage area network (SAN). The virtual machine monitor or hypervisor provides each system image with a physical media access control (MAC) address to connect the system image to the physical NIC through the PCIe switched cloud. IO devices such as NICs can support multiple virtual functions. To the server computer system, each of these virtual functions appears as a separate PCIe function which can be directly assigned. In the given example, system images SI 1 to SI K are assigned to the GbE NIC 331. The physical NIC 331 supports virtualization and represents K different virtual NICs. If system images 1 to K exceed the bandwidth of the NIC 331, the current system can't dynamically allocate resources by adding the second GbE NIC 332 to assist the traffic flow. And if data center managers and network managers discover that system image K is the one that generates the most traffic, there isn't a central management mechanism that allows a reallocation of the system image K to the NIC 332 without affecting the routing setup of the complete system.

Therefore it is desirable to balance the traffic over each NIC so that no one NIC does handle too much traffic (this is referred to as load balancing). One way of implementing load balancing is to use a round-robin approach, where the server sends out a first data packet using a first NIC, a second data packet using a second NIC, and so on. However, the round-robin approach is problematic because multiple data packets are typically associated with a given session (a transaction between a system image and a NIC), and they are now sent through different NICs, hence, the packets will arrive at the destination out-of-order. An alternative approach is to use randomized algorithms which assign packets "randomly" to available NICs. The randomized approach faces the same issues that packets will be received out-of-order. Yet another approach is the MAC-based approach where multiple data packets associated with the same session are assigned the same MAC address, but this will lead to traffic congestion on the assigned NIC if the system image has a high bandwidth demand that exceeds the NIC capability.

As the use of virtual machines (VMs) in server environments grows, and as server computer systems use multi-core hosts and multiple hosts, it may be necessary to have a dedicated host running the VM manager to coordinate the configuration of all root complexes, all PCIe switches and all IO adapters and to assign communication bandwidth to system images according to their traffic demand. Embodiments described below provide systems and methods to enable each VM on the server to access underlying physical IO devices coupled to the PCIe switching cloud.

DETAILED DESCRIPTION

Embodiments described herein provide devices, systems and methods in a server computer system utilizing a PCIe switching topology (star, tree, mesh) for fault-tolerance and for load balancing traffic across a plurality of IO adapters, where the systems and methods are not limited by the capability and the number of IO adapters used in the server computer system. The systems and methods described herein implement load balancing mechanisms that distribute the traffic load by preserving the flow order of outbound (toward the local or storage area network) data packets.

In one embodiment, a method for load balancing is presented. The method includes steps of receiving a data packet, verifying that the received packet is free of transmission errors by comparing the encapsulated CRC (cyclic redundancy check) with a recalculated value, storing the data packet if there is a match, parsing multiple header fields, performing a hashing function to obtain a hash value of a header field or a combination of header fields, assigning a new MAC address based on the obtained hash value, and sending the data packet with the new MAC address to a corresponding port.

In another embodiment, a driver software ("shim" driver) is implemented in association with a system image to add a flow identification label (tag) to the data packets. The flow identification provides packet classification to a custom-design hardware (called "NIC cluster") which analyses the flow identification tag and distributes the data packets based on classification fields in the tag.

Figure 4:
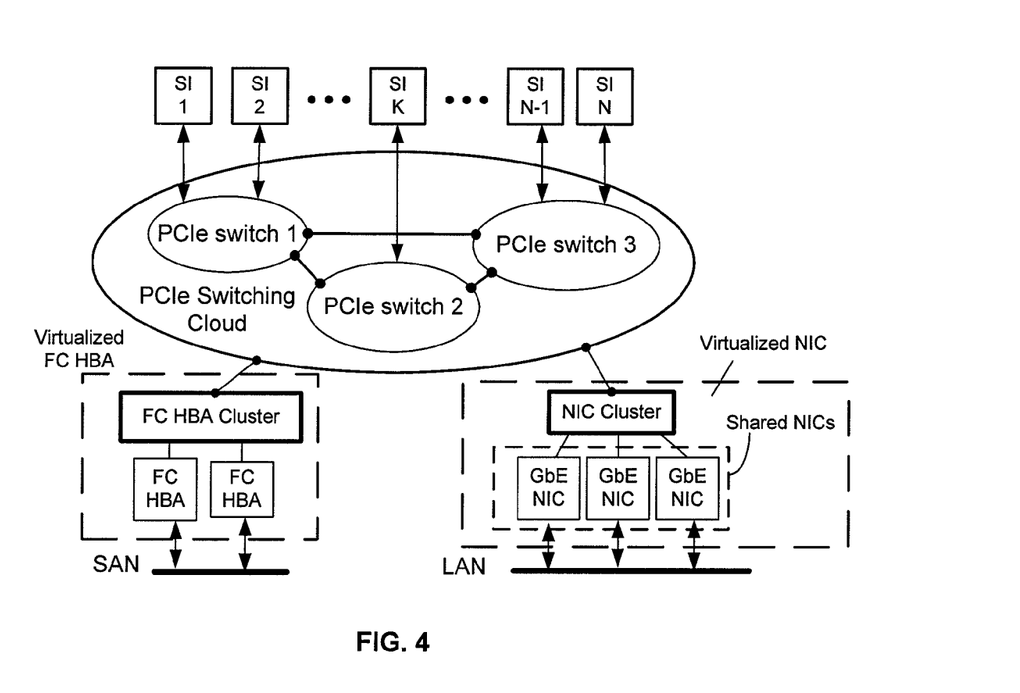
FIG. 4 shows an embodiment in which additional devices (NIC cluster, FC HBA cluster) are interposed between the PCIe switching cloud and IO adapters. For the Fibre Channel host bus adapters, the device is called FC HBA cluster; and for Ethernet NIC, the device is called NIC cluster.

The NIC cluster is introduced between the PCIe switching cloud and IO adapters. The NIC cluster hides the underlying IO adapters from system images and hence allows the IO adapters to be dynamically removed without causing the server system state to reset. The NIC cluster also allows IO adapters to be dynamically added without affecting the system images. The NIC cluster has the capability to parse headers of different types of frames encapsulated in the data packet and perform a hashing function which is implemented in hardware. FIG. 4 shows the NIC cluster (FC HBA cluster) which physically decouples GbE NICs (FC HBAs) from the PCIe switching cloud.

The NIC cluster can be implemented as an application specific integrated circuit (ASIC), a field programmable gate array (FPGA), or a custom processor with a hardware CRC engine for performing the hash function.

Embodiments herein provide an apparatus ("NIC cluster") for making a cluster of NICs appear as a single NIC to system images. The apparatus integrates functions for balancing network traffic by distributing the traffic load among a plurality of network interface controllers coupled to a network or a switch. The apparatus comprises at least one PCIe serial port which may comprise a plurality of high-speed lanes in accordance with the PCIe physical standard, multiple data link layer functions including media access control (MAC) functions, and a data processing unit coupled to a set of memory buffers. The network data link layer functions are capable of performing flow controls. One flow control mechanism is based on a hash algorithm with a uniform distribution. Another flow control mechanism is based on a link aggregation control protocol in accordance with the IEEE 802.3ad specification. Each MAC layer function is coupled directly to an integrated (on the same hardware device) GbE IO driver, or to an external GbE IO via a GMII (Gigabit media independent interface) or RGMII (reduced GMII) interface. The media access control function may be based on the Ethernet MAC protocol standard including an error processing method published by the IEEE 802 Standard Committee. Yet another flow control mechanism comprises the checking of an encapsulated CRC field by recalculating the CRC value of a received packet. The receive packet may be a PCIe transaction layer packet (TLP) in accordance with the PCI-Express frame format standardized by PCI-SIG. The TLP may comprise a second data packet in its data field. The second data packet may be an Ethernet frame format in accordance with the IEEE 802.3 standard. If the received CRC and recalculated CRC values do not match, the received packet is discarded. The checking of the CRC field in a transaction packet will avoid forwarding unnecessary erroneous packets that causes a flow overload in the downstream system. If there is a match, the NIC cluster will store the received packet in a receive buffer, which is part of the set of memory buffers. The receive buffer comprises a FIFO (First-In, First-Out). The NIC cluster performs a hashing function on the header field of the packet (e.g., computing the CRC of the header field) to obtain a hash value, determines a port including its MAC address associated with the hash value through a lookup table; inserts the MAC address of the corresponding port to the stored packet, and sends the stored packet to that port which is coupled to a LAN or an Ethernet switch. Since data packets of a session comprise the same header field, the hash value of packets belonging to the same session will be the same. This flow control mechanism thus preserves the flow order of packets which are sent out through the same port. In order to adjust the bandwidth difference between the PCIe link and the IO adapters coupled to a LAN or SAN, the receive buffer uses FIFOs (first-in first-out) with sufficient depth. If the IO adapters are of types of GbE NICs, the mechanism will support the link aggregation control protocol (LACP) in accordance with the IEEE 802.3ad standard to aggregate two or more NICs to form a link aggregate group (LAG).

Figure 6:
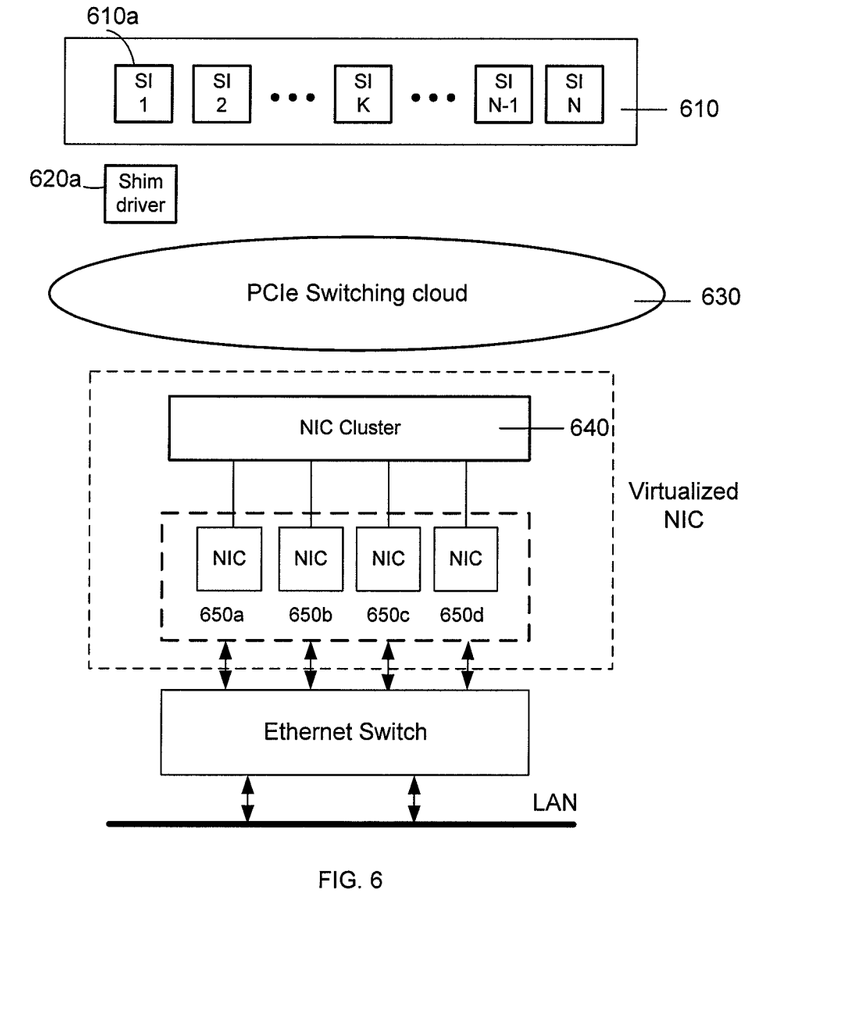
FIG. 6 shows another embodiment where a "shim driver" is added to a system image.

The embodiments taught herein provide a system for load balancing based on a flow identification tag. The system employs a combination of device driver software and device hardware to regulate the traffic flow between IO adapters and system images which are sharing the IO adapters. A flow control mechanism is necessary when there is a difference in transmission bandwidth between system images and the associated IO adapters. Device driver software ("shim" driver) may be added within a guest operating system in the server computer system or embedded in a system image. The device driver software is shown as shim driver 620*a* associated with system image SI-1 610*a* (FIG. 6). The shim driver inserts a flow identification tag in downstream packets, and a hardware device (NIC cluster 640) has the capability to process information in the tag and distribute the packets accordingly. The NIC cluster may also integrate FIFOs with adequate memory depth to adjust the different transmission rates between the PCIe link and the associated 10 adapter bandwidth. If the system is designed to connect system images to Ethernet NICs, the NIC cluster also has the intelligence to support the link aggregation control protocol (LACP) in accordance with the IEEE802.3ad standard to bond two or more of its Ethernet ports together (called a link aggregation group or LAG) such that the LAG is treated as a single NIC with one media access control (MAC) address.

Figure 7:
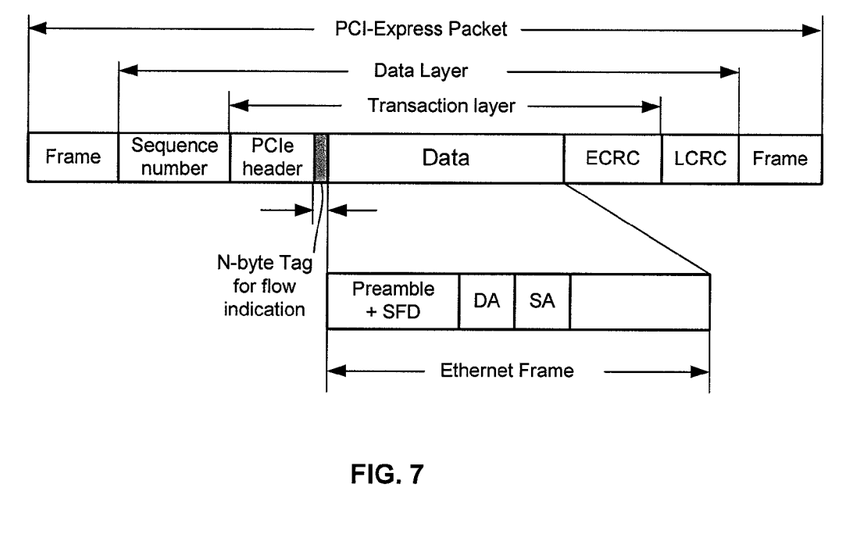
FIG. 7 shows a tag of N bytes that has been inserted between the PCIe header and the Ethernet frame according to another embodiment.

The tag used for flow identification is inserted at a predetermined location within the packet. The tag can be within the PCIe transaction packet header, in the MAC header, or preferably between the PCIe header and the Ethernet MAC header as shown in FIG. 7. The tag comprises N bytes (a byte is an 8-bit octet), N being a positive integer. In a preferred embodiment, the length of the tag used for flow identification is two bytes (2 octets). The shim driver comprises a machine usable program code which can be embedded in an application software or in an operating system and works in tandem with the associated system image.

Figure 8:
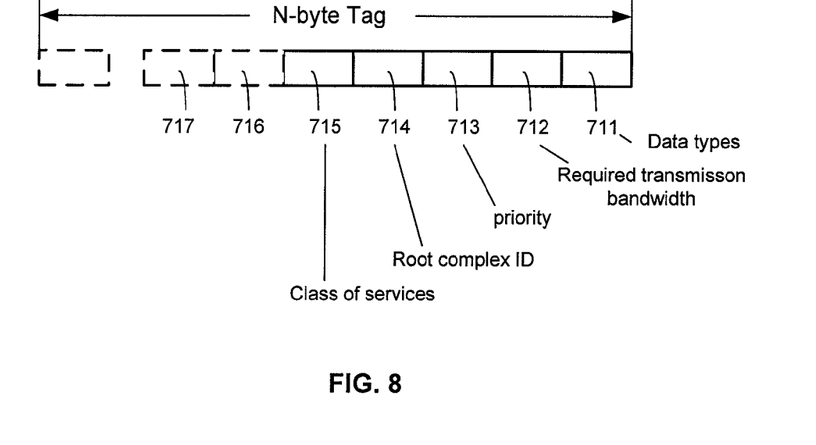
FIG. 8 shows an exemplary embodiment of the N-byte tag of FIG. 7.

The NIC cluster will distribute packets based on the N-byte tag. The N-byte tag can be divided into multiple groups of bits, with one group of bits representing for example priority information, a second group of bits representing the associated system image, the associated physical host CPU or the associated root complex, a third group of bits representing the packet type, and so on. An example of tag identification fields is shown in FIG. 8. The identification fields can be individually accessed and modified (programmed) by a human operator, by software, or a combination of human intervention and software for load balancing/flow control.

The NIC cluster comprises a custom-designed hardware which is implemented with an ASIC, FPGA or a network processor including a set of FIFOs. Additionally, The NIC cluster comprises at least one PCIe port in accordance with the PCI-Express physical format, a plurality of network data link control functions including the MAC layer function, a plurality of networking physical layer IOs (inputs/outputs) in accordance with IEEE802.3 standard. Furthermore, the NIC cluster comprises additional register sets to support multi-root IO virtualization and can present itself as a PCIe MR-IOV compliant device with multiple MAC interfaces. Moreover, the NIC cluster provides fault tolerance and failover protection through the link aggregation control protocol according to IEEE802.3ad, which teams two or more NICs together. The NIC cluster acts as a virtual NIC with a virtual MAC address so that underlying NICs are hidden from system images. The NIC cluster will handle all load distribution and state management.

The embodiments described herein, in contrast to the IEEE proposed IO virtualization, enable virtual functions to be spread across multiple physical devices. Furthermore, the embodiments enable NICs to be dynamically added or removed without upsetting the state of the system images. Additionally, because the NIC cluster appears as a single NIC to system images, there is no need for change in the conventional PCIe software under the embodiments herein.

FIG. 1 shows a single-root IO virtualization topology where the IOV endpoints 101 and 102 can be a communication interface device, a memory unit, or a hard disk drive. Endpoint 101 is a PCIe device containing a physical function PF0. PF0 is used by the SR-PCI Manager to manage the virtual functions VF0 and VF1. The virtual functions can be Ethernet network interface controllers. Ethernet hardware containing features of connecting a host system to a local area network (LAN) is generally called NIC (network interface controller). Commercially available devices that support NICs are for example the PCIe-Gigabit Ethernet ICs 82572GI from Intel or BCM5751 from Broadcom. In the SR-IOV configuration, an IO device is shared by multiple virtual machines or system images.

FIG. 2 shows an MR-IOV configuration comprising a plurality of system images. This architecture, proposed by PCI-SIG, uses a new type of MR-aware PCIe switches to connect system images to peripheral IO devices. The multi-root PCIe topology requires new specifications, new switches and IO adapters, therefore, it requires changes to existing device controllers to support sharing of IO adapters among the multi-root complexes. The shown multi-root topology comprises four root complexes RC1-4, each root complex has three system images 201a, 201b, and 201c. Root complexes RC1, RC3, RC4 are coupled to the MR-aware PCIe switches 211 and 212, which are connected to each other. The switch 211 is also coupled to the MR-aware PCIe Ethernet device 221 and the MR-aware PCIe storage device 222. Root complex 2 is shown as an empty server blade slot. The system images 201a-c of each root complex are sharing the four MR-aware PCIe endpoints, which contain for example the physical connection to a LAN or a SAN (not shown).

Server computer systems are typically coupled to networks (e.g., LAN, SAN) through PCIe switches. In a single-root environment, the PCIe switches are connected in a tree topology. In a multi-root IOV, the PCIe switching topology can be a star, tree or mesh architecture. The PCIe switching topology is presented as a PCIe cloud in the following description. FIG. 3 shows a prior art server computer system comprising multiple system images coupled to a plurality of IO adapters through the PCIe switching cloud, the IO adapters can be GbE NICs, Fibre Channel HBAs, or other communication and networking adapters (not shown). The virtual machine monitor provides each SI with a virtual NIC instance complete with MAC and IP (Internet Protocol) addresses and creates a virtual switched network to provide the connectivity between the virtual NICs and the physical NIC. The PCIe cloud can be a tree topology comprising a plurality of conventional PCIe switches if the host computer is a single-root complex system or the PCIe cloud can be a tree, star or mesh structure comprising a plurality of MR-aware PCIe switches if the host system is a multi-root complex system. The virtual machine monitor or hypervisor provides each system image with a MAC address to connect the system image to a physical NIC through the PCIe switched cloud. System images SI-1 to SI-K are assigned to the GbE NIC 331, which supports virtualization and represents K different virtual NICs. If system images 1 to K exceed the bandwidth of the NIC 331, the current system can't dynamically add the second GbE NIC 332 to increase network bandwidth or distribute some traffic load to the NIC 333 to balance the flow. And if data center managers and network managers discover that system image K is the one that generates the most traffic, there isn't a management mechanism that allows a reassignment of the system image K to the NIC 332 without affecting the routing setup of the complete system.

FIG. 4 shows a configuration where additional devices (NIC cluster, FC HBA cluster) are interposed between the PCIe switching cloud and IO adapters, under an embodiment. For the Fibre Channel host bus adapters, the device is called FC HBA cluster; and for Ethernet NIC, the device is called NIC cluster. The PCIe switching cloud can be a star, tree or mesh topology; i.e., the system configuration can be a single root complex or a multi-root complex system. A hardware device called a NIC cluster is interposed between the PCIe switching cloud and a plurality of NICs.

Figure 5:
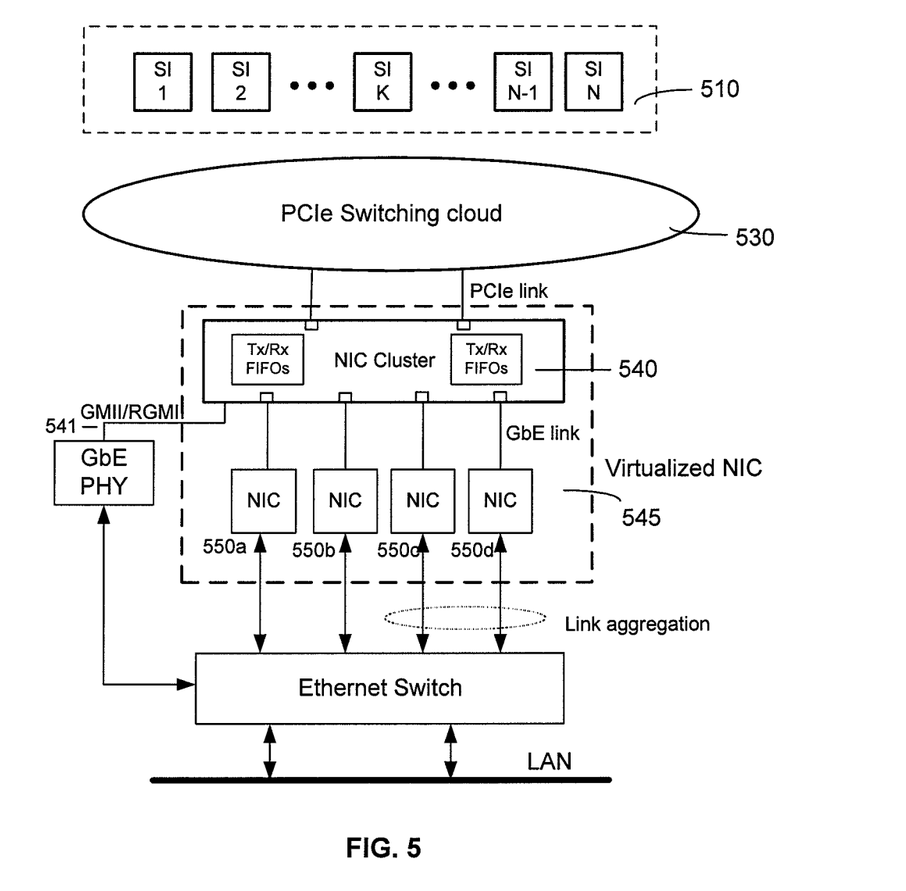
FIG. 5 shows a simplified block diagram of FIG. 4 where the NIC cluster and underlying NICs are presented as a virtual NIC 545 according to an embodiment.

FIG. 5 shows a simplified block diagram of the system configuration of FIG. 4, where the PCIe switches are now presented as a PCIe switching cloud 530 and the FC HBA cluster and FC HBAs are omitted for clarity reason. The NIC cluster 540 comprises at least one PCIe port (link) with a plurality of lanes in accordance with the PCI-Express physical format standardized by PCI-SIG. The NIC cluster also comprises a plurality of MAC layer functions, some of which are connected directly to GbE physical IOs which are integrated in the NIC cluster and others can be coupled directly to external GbE drivers through a GMII or RGMII (reduced Gigabit media independent interface) interface 541. The NIC cluster is capable of discovering all Ethernet ports to its IOs and associates a predetermined range of values with each port. The NIC cluster comprises multiple transmit and receive FIFOs to adjust the difference in bandwidth between a PCIe link and GbE NICs. The NIC cluster further comprises a hash engine that performs a CRC function on a selected header field. The header field can be a MAC header, an IP header, a TCP/UDP header or a combination of the IP and TCP/UDP headers. Based on the obtained hash value, packets are then forwarded to an associated port. Packets that belong to the same session have the same MAC address so the computed hash value will be the same for all packets of the same session. As a consequence, the packets will be forwarded to the same port, and their flow order will be preserved.

The NIC cluster serves as a virtual NIC which isolates the underlying IO devices from the PCIe switching cloud. The NIC cluster appears as a single virtual NIC with a single MAC address to system images, wherein the underlying IO devices (e.g., NICs) function as PCIe IOV (IO virtualization) capable endpoints.

The NIC cluster can be implemented as an ASIC, FPGA or a custom-processor having the capability to:
a) couple to a PCIe link comprising a plurality of lanes in accordance with the PCI-Express physical format standardized by PCI-SIG;
b) couple to a plurality of GbE NICs to provide resiliency and redundancy when one of the NICs fails;
c) perform the link aggregation control protocol to bond two or more GbE NICs in a link aggregation group (LAG) to increase bandwidth according to the LACP protocol standardized in IEEE 802.3ad;
d) detect when a NIC fails, and switch to a working NIC (fault tolerant and failover support);
e) parse data packets, and then perform a hash function on select header fields to preserve flow order; and
f) support PCI-Express multiple physical functions, multiple virtual functions and multi-root IO virtualization.

A hash function such as CRC16, CRC32 provides a uniform distribution of hash values, which are spaced evenly in multiple chunks. However, when the hash function performing on the MAC addresses delivers hash values within the same chunk, it will lead to an uneven distribution of load to the NICs. This may cause a flow congestion of the NIC associated with this hash value range. In an alternative embodiment, the NIC cluster may extend the hash computation to higher layer addresses, e.g., IP layer addresses or IP layer addresses in combination with TCP/UDP layer addresses. The IP addresses can be either the 32-bit IPv4 addresses or the 128-bit IPv6 addresses.

The NIC cluster appears to the server computer system as a single NIC having a single MAC address (the virtual MAC address). The NIC cluster behaves as a PCIe capable device with a bus number, a device number and a function number. The default function number is 8 and can be extended to 256 with the alternative routing interpretation (ARI).

The NIC cluster intercepts all network data packets sent by system images as well as other network data packets sent by other PCIe devices coupled to the PCIe switching cloud.

FIG. 6 shows another system configuration, under an alternative embodiment. A virtual device driver is introduced in tandem with the NIC cluster 640. A server computer system 610 comprises a single host or multiple hosts, and each host comprises a plurality of system images. In this example, the system image 610a comprising a shim driver 620a is coupled to the NIC cluster 640 via the PCIe switching cloud 630. The NIC cluster 640 is physically coupled to four NICs 650a-d to form a virtualized NIC. The NICs 650a-d are coupled to a conventional Ethernet switch. Only four NICs are shown for illustration purposes, although it is appreciated that any number of NICs may be used in accordance with the embodiments presented herein. The NIC cluster 640 appears to the server computer system 610 as a single NIC device having a "virtual" MAC address. The virtual device driver, called "shim driver", comprises a machine usable program code which can be embedded in the operating system (e.g., Microsoft Windows, Linux, SUN Microsytems Solaris, HP-UX, IBM AIX) or in the guest operation software of the system image. The shim driver will insert a fixed-length tag (e.g., a label comprising a fixed integer number of bytes) to outgoing (downstream) data packets. The tag may comprise information about the packet types, their routing priority, the required transmission bandwidth, and/or any other relevant information necessary to allow the NIC cluster 640 to forward the packets to their destination without having to parse deep inside the packet. The downstream data packets are the PCIe transaction packets where the data field encapsulates any type of packet frames (InfiniBand, Ethernet, Fibre Channel, TCP/IP and others).

FIG. 7 illustrates a PCI-Express packet which comprises a transaction layer embedded in a data layer, under an embodiment. The data layer includes a sequence number, the transaction layer and a LINK LCRC. The data field of the transaction layer may comprise a network data link layer frame that includes a network layer frame, the network layer frame comprising a transport layer frame. In one embodiment, the network data link layer frame can be an Ethernet frame in accordance with the IEEE802.3 standard. The NIC cluster can optionally check the integrity of the received transaction layer packets (TLPs) by comparing the received LCRC (FIG. 7) with a recomputed CRC value of transaction packet. If there is a match, the NIC cluster will then store the packet in a receive buffer. If the two CRC values don't match, the received TLPs are discarded. This process will avoid storage and further processing of unnecessary erroneous packets that cause a flow overload in the downstream. The methods for computing a CRC of a data frame or a header field are well known in the art.

FIG. 8 shows an exemplary embodiment of the tag inserted by the shim driver and used by the NIC cluster for flow identification, under an embodiment. The tag comprises N bytes, N being an integer. The N-byte tag is divided into a plurality of flow identification fields. Each of the identification fields comprises a plurality of bits. By way of example, identification field 711 represents the frame types encapsulated in the PCIe transaction packet (e.g., Ethernet, InfiniBand, Fibre Channel), identification field 712 represents the required bandwidth of the associated data packet, identification field 713 represents the priority, identification field 714 represents the unique identifier of the root complex, identification field 715 class of services, and so forth. The shim driver also provides a graphical user interface to network administrators and datacenter managers to intervene by assigning classes or types of services to any system image in other identification fields. The flow identification tag and its associated fields are given merely by way of example and are not to unduly limit the scope of the embodiments. One of ordinary skill in the art would recognize many variations, modifications, and alternatives.

The NIC cluster executes the load balancing mechanism solely based on the information obtained in the tag. For example, the NIC cluster sends the stored packets in a queue based on a value obtained from the priority field or required bandwidth field. The NIC cluster also can team two or more NICs together based on the value obtained from the flow identification fields.

The NIC cluster will distribute packets based on the embedded flow identification tag. In one embodiment, the flow identification tag has a length of two bytes. The NIC cluster uses the information comprising in the tag to optimize the flow control, for example, the cluster may team two or more Ethernet ports to accommodate the transmission rate requested by a system image. Therefore, under the embodiments herein, processing a fixed-length tag is far easier and faster than the normal parsing process, wherein a network processor needs to examine a packet and identify pre-defined header fields of interest.

The embodiments herein introduce a method of hiding the NIC devices from system images. There is no need to change or modify current operation systems and existing device drivers.

The NIC cluster performs load balancing in many ways: (1) using a hash value; (2) using the link aggregation control protocol to band two or more NICs in accordance with the IEEE 802.3ad specification; (3) verifying an error-free packet by recalculating a CRC value; or (4) a combination of hardware and software. In one embodiment, the NIC cluster integrates the LACP protocol and implements the CRC engine and hash function in hardware.

In another embodiment, the NIC cluster has the process capability to parse (analyze) Ethernet packets and perform hashing to preserve flow order.

In yet another embodiment, a combination of NIC cluster hardware and corresponding device driver software can be used. The device driver software (shim driver) may reside in a system image or in a guest operating system to assist the flow control of the NIC cluster. The NIC cluster will distribute data packets solely based on the information in the tag.

While the present invention has been shown and described with reference to certain preferred embodiments, it is understood by those skilled in the art that various changes or forms may be made thereon without departing from the scope of the present invention as defined by the appended claims.

What is claimed is:

1. A load balancing apparatus comprising:
    at least one Peripheral Component Interconnect Express (PCIe) high-speed serial link comprising a plurality of lanes;
    a plurality of network data link layer control functions configured to perform flow controls, each network data link control function coupled to one of a plurality of physical network interface controllers (NICs); and
    a virtual network interface controller (NIC) coupled with the at least one PCIe high-speed serial link and the plurality of physical network interface controllers (NICs), the virtual network interface controller comprising a data processing unit coupled to a set of data buffers for parsing, processing, and storing a plurality of data packets which are addressed to the virtual network interface controller, wherein each data packet encapsulates a data frame, and wherein the data processing unit is configured to direct the data packets between the physical network interface controllers (NICs) and system images in accordance with load balancing functions of the flow controls, the load balancing functions including:
    selecting different ones of the physical network interface controllers (NICs) for communication of different ones of the data packets;
    assigning addresses of the different ones of the physical network interface controllers (NICs) to the different ones of the data packets in accordance with the selection; and
    forwarding the different ones of the data packets to a plurality of different ports which are associated with respective ones of the assigned addresses of the different ones of the physical network interface controllers (NICs).

2. The load balancing apparatus of claim 1, wherein the network data link layer control functions comprise at least a first flow control mechanism and a second flow control mechanism.

3. The load balancing apparatus of claim 2, wherein the first flow control mechanism is based on a hash with a uniform distribution.

4. The load balancing apparatus of claim 2, wherein the second flow control mechanism is based on link aggregation.

5. The load balancing apparatus of claim 2, wherein the network data link layer control functions comprise a media access control (MAC) layer function, wherein the MAC layer function is based on a MAC protocol standard including error processing.

6. The load balancing apparatus of claim 1, wherein the at least one PCIe high-speed serial link is a PCIe endpoint comprising a set of physical functions, wherein the set of physical functions is used by a single-root and multi-root PCIe manager to manage a plurality of virtual functions.

7. The load balancing apparatus of claim 1, wherein a first of the data packets is a PCIe transaction layer packet (TLP), wherein the first data packet embeds a second of the data packets.

8. The load balancing apparatus of claim 7, wherein the data processing unit performs a cyclic redundancy check (CRC) on the PCIe TLP to verify that the PCIe TLP is free of errors, parses the second data packet if the PCIe TLP is error-free, performs a first flow control mechanism, stores the second data packet in the set of data buffers, and selects a first MAC address based on the result of the first flow control mechanism.

9. The load balancing apparatus of claim 8, wherein the set of data buffers comprise a plurality of first-in first-out (FIFO) buffers.

10. The load balancing apparatus of claim 8, wherein the data processing unit inserts the selected first MAC address into the second data packet and sends the second data packet to a first of the ports.

11. The load balancing apparatus of claim 1, wherein the data frame comprises an Ethernet frame format.

12. The load balancing apparatus of claim 1, wherein each network data link layer control function comprises a MAC layer function coupled to the one of the physical network interface controllers (NICs) via a Gigabit Media Independent Interface (GMII) or a Reduced GMII (RGMII).

13. A network input/output (I/O) clustering system for load balancing in a system of networking system images, the network I/O clustering system comprising:
    a shim driver configured to receive a plurality of data packets from the system of networking system images and to associate a plurality of flow identification tags with the data packets, the flow identification tags classifying the data packets;
    a plurality of network data link layer control functions configured to perform flow controls, each network data link control function coupled to one of a plurality of physical network interface controllers; and
    a network interface card (NIC) cluster comprising the plurality of physical network interface controllers, and wherein the NIC cluster is configured to process the flow identification tags of the data packets and to forward the data packets to different ones of the physical network interface controllers as a result of the processing of the flow identification tags to implement load balancing functions of the flow controls.

14. The network I/O clustering system of claim 13, wherein the shim driver comprises a machine usable program which can be embedded in at least one of an operating system and a system image.

15. The network I/O clustering system of claim 14, wherein the machine usable program associates the flow identification tags individually having a fixed integer number of octets (8-bit byte) for flow identification, and wherein the flow identification tags are inserted at fixed locations within the data packets.

16. The network I/O clustering system of claim 15, wherein the flow identification tags are individually divided into a plurality of flow identification fields.

17. The network I/O clustering system of claim 16, wherein the plurality of flow identification fields is editable by a network operator.

18. The network I/O clustering system of claim 16, wherein the NIC cluster comprises:
at least one PCIe port in accordance with a PCIExpress physical format;
a data processing unit comprising a cyclic redundancy check (CRC) engine and an evaluation mechanism for parsing the plurality of flow identification fields.

19. The network I/O clustering system of claim 18, wherein the NIC cluster receives a first of the data packets at the PCIe port, computes a CRC of the first data packet to obtain a first Link CRC (LCRC) value, compares the first LCRC value with an LCRC encapsulated in the first data packet, evaluates a first of the flow identification fields if there is a match, and selects a flow control procedure based on a value obtained from the evaluation.

20. The network I/O clustering system of claim 19, wherein the flow control procedure comprises at least a first flow control scheme, a second flow control scheme, and a third flow control scheme.

21. The network I/O clustering system of claim 20, wherein the first flow control scheme directly forwards a data field within the first data packet to an associated one of the physical network interface controllers.

22. The network I/O clustering system of claim 20, wherein the second flow control scheme stores the data field in a FIFO.

23. The network I/O clustering system of claim 20, wherein the third flow control scheme teams at least two of the physical network interface controllers.

24. A communications method comprising:
receiving a data packet from at least one of a plurality of clustered system images using components of a network interface controller (NIC)cluster;
verifying that the received data packet is free of errors;
storing the error-free data packet in a receiving First-In First-Out (FIFO) buffer;
executing a flow control mechanism using load balancing functions to obtain a first hash value, the flow control mechanism from a plurality of network data link layer control functions each coupled to one of a plurality of physical NICs of the NIC cluster;
sending the data packet to a first physical NIC of the NIC cluster which is associated with the first hash value;
detecting the first physical NIC has failed; and
forwarding the data packet to a second physical NIC of the NIC cluster as a result of the detecting.

25. The method of claim 24, wherein the data packet is a Peripheral Component Interconnect Express (PCIe)transaction layer packet comprising a PCIe transaction layer frame, a PCIe data layer frame and a data field which comprises a transport layer frame, the transport layer frame being encapsulated in a network layer frame, and the network layer frame being encapsulated in a network data link layer frame.

26. The method of claim 25, wherein the network data link layer frame is an Ethernet frame.

27. The method of claim 25, wherein the verifying further comprises:
performing a cyclic redundancy check (CRC) on the data layer frame to obtain a first CRC value; and
comparing the first CRC value with an encapsulated Link CRC value embedded in the data layer frame.

28. The method of claim 25, wherein the flow control mechanism comprises:
extracting a plurality of headers within the data field into a layer 2 header, a layer 3 header, and a layer 4 header;
performing a hashing function on a first header segment to obtain the first hash value; and
selecting the first physical NIC associated with the first hash value.

29. The method of claim 28, wherein the first header segment comprises at least one of the layer 2 header, the layer 3 header, and a combination of the layer 3 header with the layer 4 header.

30. The method of claim 28, wherein the layer 2 header comprises a MAC header.

31. The method of claim 28, wherein the layer 3 header comprises an IPv4 header comprising a 32-bit destination address and a 32-bit source address in accordance with an Internet Protocol (IP) packet format.

32. The method of claim 28, wherein the layer 4 header comprises a TCP/UDP header in accordance with an Internet Protocol (IP) packet format.

33. The method of claim 28, wherein the hashing function performs a cyclic redundancy check (CRC).

34. The method of claim 24, wherein the NIC cluster has a PCIe bus number and a virtual MAC address.

35. A method for assigning a plurality of network interface cards (NICs) to a system image in a server computer cluster, the method comprising:
directing network traffic between the plurality of network interface cards (NICs) and the system image through a Peripheral Component Interconnect Express (PCIe) switching cloud;
providing a machine usable program code to the system image, wherein the machine usable program code inserts a tag into a downstream data packet using load balancing functions, the tag classifying the downstream data packet;
using a NIC cluster device, parsing the tag, the NIC cluster device comprising a plurality of network data link layer control functions configured to performflow controls, each network data link control function coupled to one of the plurality of network interface cards (NICs);
selecting one associated output from a plurality of outputs as a result of the parsing; and
directing the downstream data packet to the one associated output in accordance with the selecting.

36. The method of claim 35, wherein the tag comprises a fixed integer number of octets (8-bit byte) for flow identification, wherein the tag is inserted at a predetermined location within the downstream data packet.

37. The method of claim 36, wherein the flow identification comprises a plurality of flow identification fields.

38. The method of claim 35, wherein the NICs are provided within a NIC cluster and wherein the NIC cluster comprises:
at least one PCIe link in accordance with a PCI Express physical format;
wherein each NIC is associated with a MAC address; and
a data processor coupled to a set of data buffers.

39. The method of claim 38, wherein the plurality of NICs comprise PCIe IOV-(IO virtualization) capable endpoints.

40. The method of claim 38, wherein the data processor handles load distribution and state management based on information obtained from a plurality of flow identification fields.

41. The load balancing apparatus of claim 1, wherein the data packets originate from the system images, and the data processing unit is configured to associate two of the physical network interface controllers (NICs) with one of the system images, and to identify some of the data packets as originating from the one of the system images, and wherein the assigning comprises assigning the respective addresses of the two of the physical network interface controllers (NICs) to the some of the data packets which originated from the one of the system images.

42. The network I/O clustering system of claim 13, further comprising a Peripheral Component Interconnect Express (PCIe) switching cloud which is configured to communicate the data packets between the system of networking system images and the network interface card (NIC) cluster, and wherein the shim driver is configured to associate the flow identification tags with the data packets prior to communication of the data packets using the Peripheral Component Interconnect Express (PCIe) switching cloud.

43. The network I/O clustering system of claim 13, wherein the network interface card (GI-D-NIC) cluster is configured to select different flow control mechanisms as a result of the processing of the flow identification tags, and wherein the different flow control mechanisms select the different ones of the physical network interface controllers.

44. The network I/O clustering system of claim 13, wherein the shim driver comprises a user interface configured to enable a user to define the contents of the flow identification tags to control the forwarding of the data packets.

45. The method of claim 24, further comprising associating the first and second NICs with the at least one of the clustered system images as a result of the executing.

46. The method of claim 45, wherein the associating comprises associating to accommodate a transmission rate of the at least one of the clustered system images.

47. The method of claim 35, wherein the tag indicates a priority of the downstream data packet, and the selecting comprises selecting according to the priority.

48. The method of claim 35, wherein the tag indicates a transmission bandwidth of the downstream data packet, and the selecting comprises selecting according to the transmission bandwidth.

* * * * *